United States Patent
Ye et al.

(10) Patent No.: US 10,681,536 B1
(45) Date of Patent: Jun. 9, 2020

(54) CELLULAR DEVICE AND METHOD FOR DETERMINING OPERATION MODE THEREOF

(71) Applicant: Wistron NeWeb Corporation, Hsinchu (TW)

(72) Inventors: Kuo-He Ye, Hsinchu (TW); Che-Fang Yeh, Hsinchu (TW); Tien-Chu Wang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 16/371,206

(22) Filed: Apr. 1, 2019

(51) Int. Cl.
  *H04W 8/24* (2009.01)
  *H04W 48/16* (2009.01)
  *H04W 8/18* (2009.01)
  *H04W 48/18* (2009.01)
  *H04W 84/04* (2009.01)

(52) U.S. Cl.
  CPC .............. *H04W 8/24* (2013.01); *H04W 8/183* (2013.01); *H04W 48/16* (2013.01); *H04W 48/18* (2013.01); *H04W 84/042* (2013.01)

(58) Field of Classification Search
  CPC ........... H04W 4/00; H04W 4/02; H04W 4/50; H04W 4/90; H04W 28/08; H04W 28/06; H04W 36/0085; H04W 76/16; H04W 92/00; H04W 36/0061; H04W 84/045; H04W 8/183; H04W 8/24; H04W 48/16; H04W 48/18; H04W 84/042
  See application file for complete search history.

(56) References Cited

U.S. PATENT DOCUMENTS

| | | | | |
|---|---|---|---|---|
| 2004/0203572 A1* | 10/2004 | Aerrabotu | ............... | H04W 4/90 455/404.1 |
| 2011/0141910 A1* | 6/2011 | Rosik | .................... | H04W 48/20 370/241 |
| 2011/0306341 A1* | 12/2011 | Klein | ................... | H04B 1/7083 455/434 |
| 2012/0015649 A1* | 1/2012 | Li | ..................... | H04W 36/0061 455/434 |
| 2012/0134312 A1* | 5/2012 | Kim | ..................... | H04W 72/005 370/312 |
| 2012/0295582 A1* | 11/2012 | Olofsson | ............. | H04M 15/745 455/406 |
| 2014/0328177 A1* | 11/2014 | Zhao | ..................... | H04W 28/08 370/235 |
| 2017/0325260 A1* | 11/2017 | Guo | .................... | H04L 27/2602 |

(Continued)

*Primary Examiner* — Jean A Gelin
(74) *Attorney, Agent, or Firm* — McClure, Qualey & Rodack, LLP

(57) ABSTRACT

A method for determining an operation mode of a cellular device provides a first group cell identity obtaining step, a second group cell identity obtaining step and a group cell identity comparing step. The first group cell identity obtaining step includes configuring the cellular device to obtain at least one first group cell identity corresponding to a base station, and storing the at least one first group cell identity in a local list of the cellular device. The second group cell identity obtaining step includes configuring the cellular device to perform a scan procedure to obtain at least one second group cell identity. The group cell identity comparing step includes comparing the at least one first group cell identity with the at least one second group cell identity to determine the operation mode of the cellular device.

12 Claims, 9 Drawing Sheets

(56) References Cited

U.S. PATENT DOCUMENTS

2018/0054340 A1* 2/2018 Rico Alvarino .... H04L 27/2082
2019/0007870 A1* 1/2019 Gupta ............... H04W 36/0061
2019/0069229 A1* 2/2019 Lee ....................... H04W 48/18

* cited by examiner

CELLULAR DEVICE AND METHOD FOR DETERMINING OPERATION MODE THEREOF

BACKGROUND

Technical Field

The present disclosure relates to a cellular device and a method for determining an operation mode thereof. More particularly, the present disclosure relates to a cellular device and a method for determining an operation mode thereof which are capable of limiting services of the cellular device when the cellular device is moved.

Description of Related Art

Rapid advances in communication technologies, driven by immense customer demand, have resulted in the widespread adoption of wireless communication devices. Cellular devices, e.g., routers, gateways or access points, have sophisticated wireless connectivity options. FIG. 1 shows a schematic view of a conventional registration procedure between a cellular device CD and a base station BS. The conventional registration procedure includes a synchronization step S01, a system information broadcasting step S02, a random access step S03 and an attach procedure step S04, as shown in FIG. 1. The synchronization step S01 includes configuring the cellular device CD to the base station BS to get time and frequency synchronized. The system information broadcasting step S02 includes configuring the base station BS to broadcast system information. The random access step S03 includes configuring the cellular device CD to perform a random access procedure to request the base station BS to allocate a dedicated resource for the cellular device CD. The attach procedure step S04 includes configuring the cellular device CD to perform an attach procedure.

For a purpose of a fixed location cellular device, when the cellular device is moved, the location of the cellular device will be monitored via an Internet service provider (ISP). If the cellular device is moved out of an allowable range assigned by the ISP, it will be locked by the ISP. Therefore, a cellular device and a method for determining the operation mode thereof which are capable of having a control right to determine the operation mode of the cellular device are commercially desirable.

SUMMARY

According to one aspect of the present disclosure, a method for determining an operation mode of a cellular device provides a first group cell identity obtaining step, a second group cell identity obtaining step and a group cell identity comparing step. The first group cell identity obtaining step includes configuring the cellular device to obtain at least one first group cell identity corresponding to a base station and storing the at least one first group cell identity in a local list of the cellular device. The second group cell identity obtaining step includes configuring the cellular device to perform a scan procedure to obtain at least one second group cell identity. The cell identity comparing step includes comparing the at least one first group cell identity with the at least one second group cell identity to determine the operation mode of the cellular device.

According to another aspect of the present disclosure, a cellular device includes a memory and an application processor. The application processor is signally connected to the memory and configured to implement a method for determining an operation mode of the cellular device. The method provides a first group cell identity obtaining step, a second group cell identity obtaining step and a group cell identity comparing step. The first group cell identity obtaining step includes configuring the cellular device to obtain at least one first group cell identity corresponding to a base station and storing the at least one first group cell identity in a local list of the cellular device. The second group cell identity obtaining step includes configuring the cellular device to perform a scan procedure to obtain at least one second group cell identity. The cell identity comparing step includes comparing the at least one first group cell identity with the at least one second group cell identity to determine the operation mode.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

Figure 1:
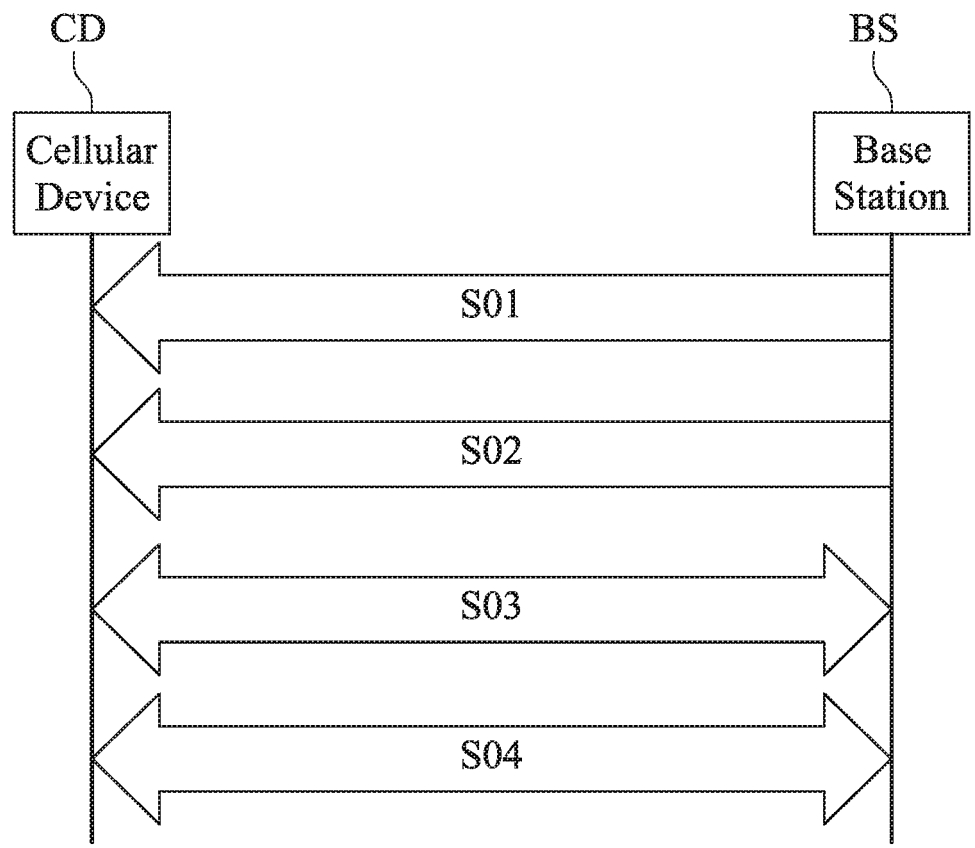
FIG. 1 shows a schematic view of a conventional registration procedure between a cellular device and a base station.
Figure 2:
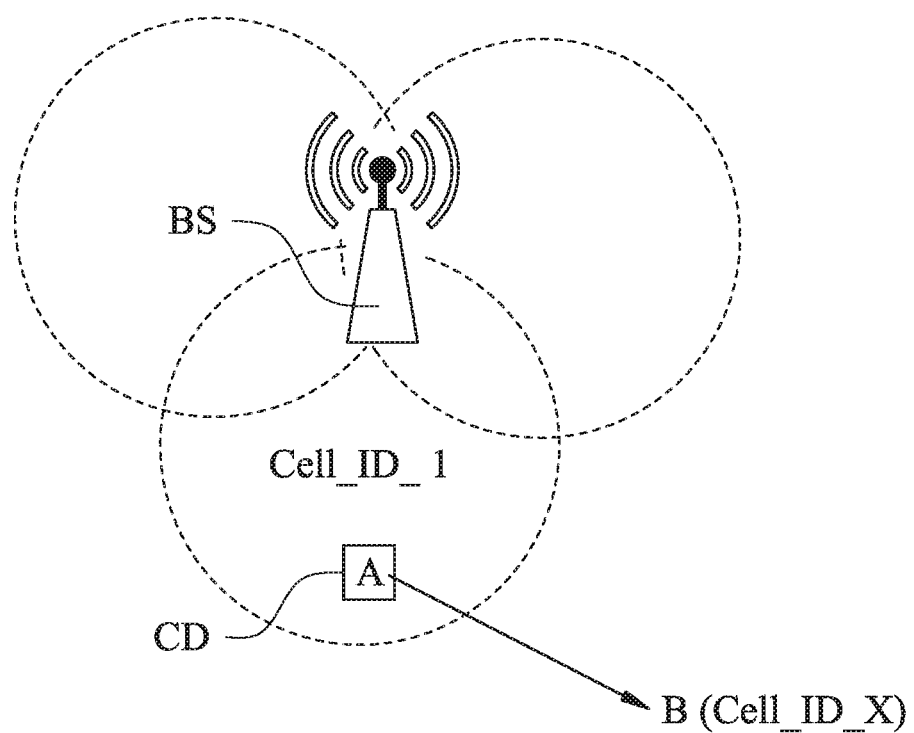
FIG. 2 shows a schematic view of locations of the cellular device relative to the base station according to a first embodiment of the present disclosure.
Figure 3:
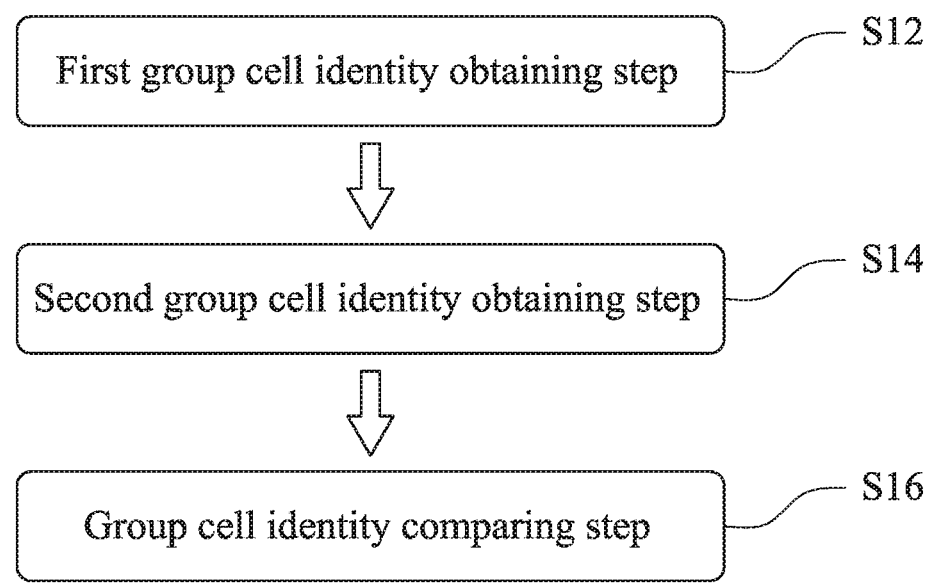
FIG. 3 shows a flow chart of a method for determining an operation mode of the cellular device according to the first embodiment of the present disclosure.

FIG. 2 shows a schematic view of locations of the cellular device relative to the base station according to a first embodiment of the present disclosure. FIG. 3 shows a flow chart of a method 100 for determining an operation mode of the cellular device CD according to the first embodiment of the present disclosure. The method 100 for determining the operation mode of the cellular device CD is performed to check whether the cellular device CD is moved or not. In FIG. 3, the method 100 provides a first group cell identity obtaining step S12, a second group cell identity obtaining step S14 and a group cell identity comparing step S16.

The first group cell identity obtaining step S12 includes configuring the cellular device CD to obtain at least one first group cell identity corresponding to a base station BS at a first time, and storing the at least one first group cell identity in a local list of the cellular device CD. The second group cell identity obtaining step S14 includes configuring the cellular device CD to perform a scan procedure to obtain at least one second group cell identity at a second time, and the second time is after the first time. The group cell identity comparing step S16 includes comparing the at least one first group cell identity with the at least one second group cell identity to determine the operation mode of the cellular device CD. The operation mode includes a normal service mode and a limited service mode. In response to determining that the at least one second group cell identity is different from the at least one first group cell identity, the cellular device CD more easily enters the limited service mode in a strict criterion for limiting the cellular device CD. In one embodiment, the cellular device CD may apply a loose criterion that when each of the at least one first group cell identity is different from each of the at least one second group cell identity, the cellular device CD enters the limited service mode. In response to determining that the at least one second group cell identity is the same as the at least one first group cell identity, the cellular device CD enters the normal service mode.

For example, in FIG. 2, which shows the schematic view of locations of the cellular device CD relative to the base station BS. When the cellular device CD is moved from a location A at the first time to a location B at the second time, the first group cell identity obtaining step S12, the second group cell identity obtaining step S14 and the group cell identity comparing step S16 are sequentially performed. The base station BS may have a plurality of Cell IDs corresponding to a plurality of group cell identities. In the first group cell identity obtaining step S12, the cellular device CD obtains the first group cell identity G_Cell_ID_1 corresponding to the base station BS at the first time, and storing the first group cell identity G_Cell_ID_1 in the local list of the cellular device CD. Then, in the second group cell identity obtaining step S14, the cellular device CD performs the scan procedure to obtain the second group cell identity G_Cell_ID_X at the second time. The second time is after the first time. Finally, in the group cell identity comparing step S16, the first group cell identity G_Cell_ID_1 is compared with the second group cell identity G_Cell_ID_X to determine the operation mode of the cellular device CD. The operation mode includes the normal service mode and the limited service mode. Because the second group cell identity G_Cell_ID_X is different from the first group cell identity G_Cell_ID_1, the cellular device CD enters the limited service mode, i.e., the operation mode of the cellular device CD is determined to be the limited service mode. On the contrary, if the cellular device CD is not moved, the second group cell identity is also G_Cell_ID_1 so as to be the same as the first group cell identity G_Cell_ID_1, the cellular device CD enters the normal service mode, i.e., the operation mode of the cellular device CD is determined to be the normal service mode. The normal service mode represents that the cellular device CD provides an Internet service via Wi-Fi or Ethernet. The limited service mode represents that the cellular device only provides an emergency call service or an emergency message service via circuit switch which is without Internet service. Therefore, the method 100 of the present disclosure can configure the cellular device CD to determine its operation mode instead of an Internet service provider (ISP). The location of the cellular device CD may be monitored via group cell identity comparison for locking location, so that the cellular device CD of the present disclosure has a control right to determine the operation mode.

Figure 4:
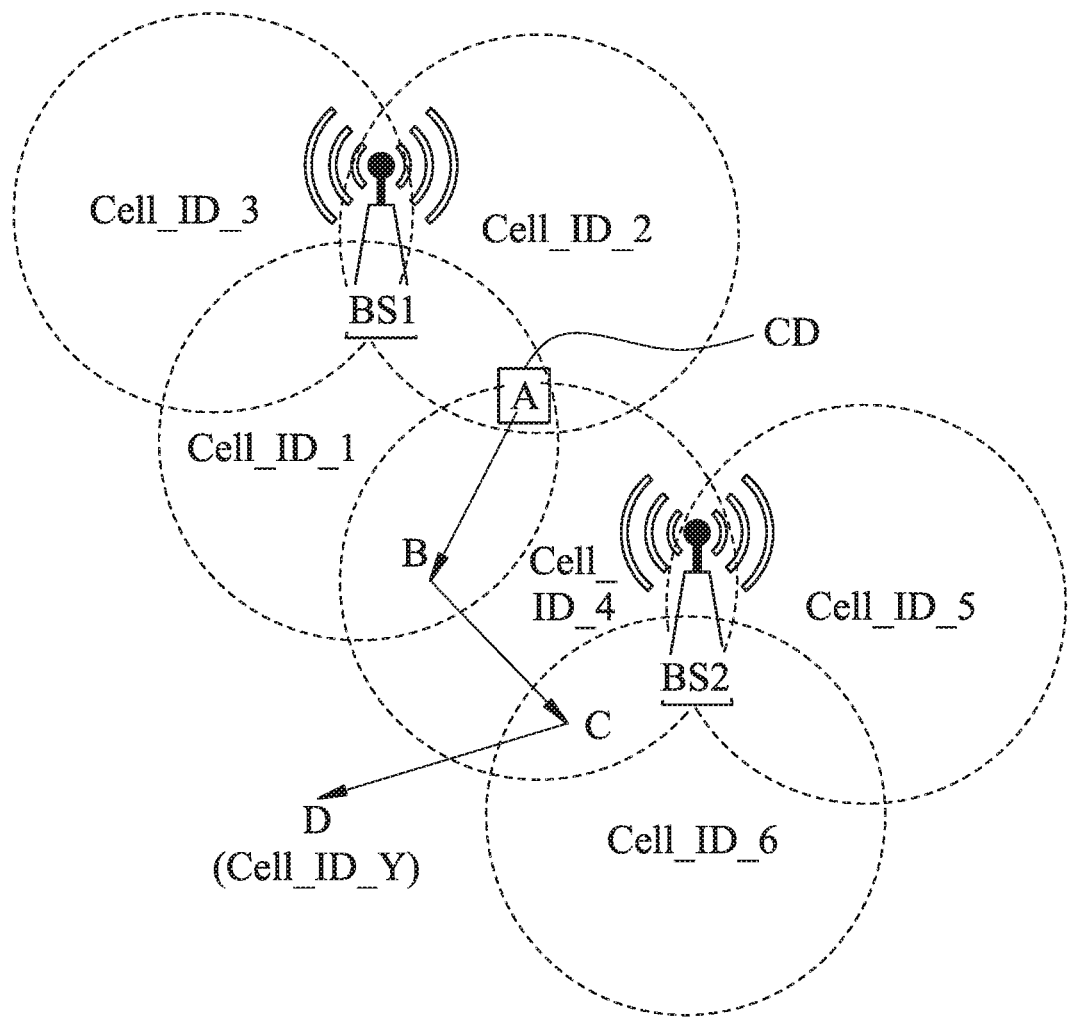
FIG. 4 shows a schematic view of locations of the cellular device relative to two base stations according to a second embodiment of the present disclosure.
Figure 5A:
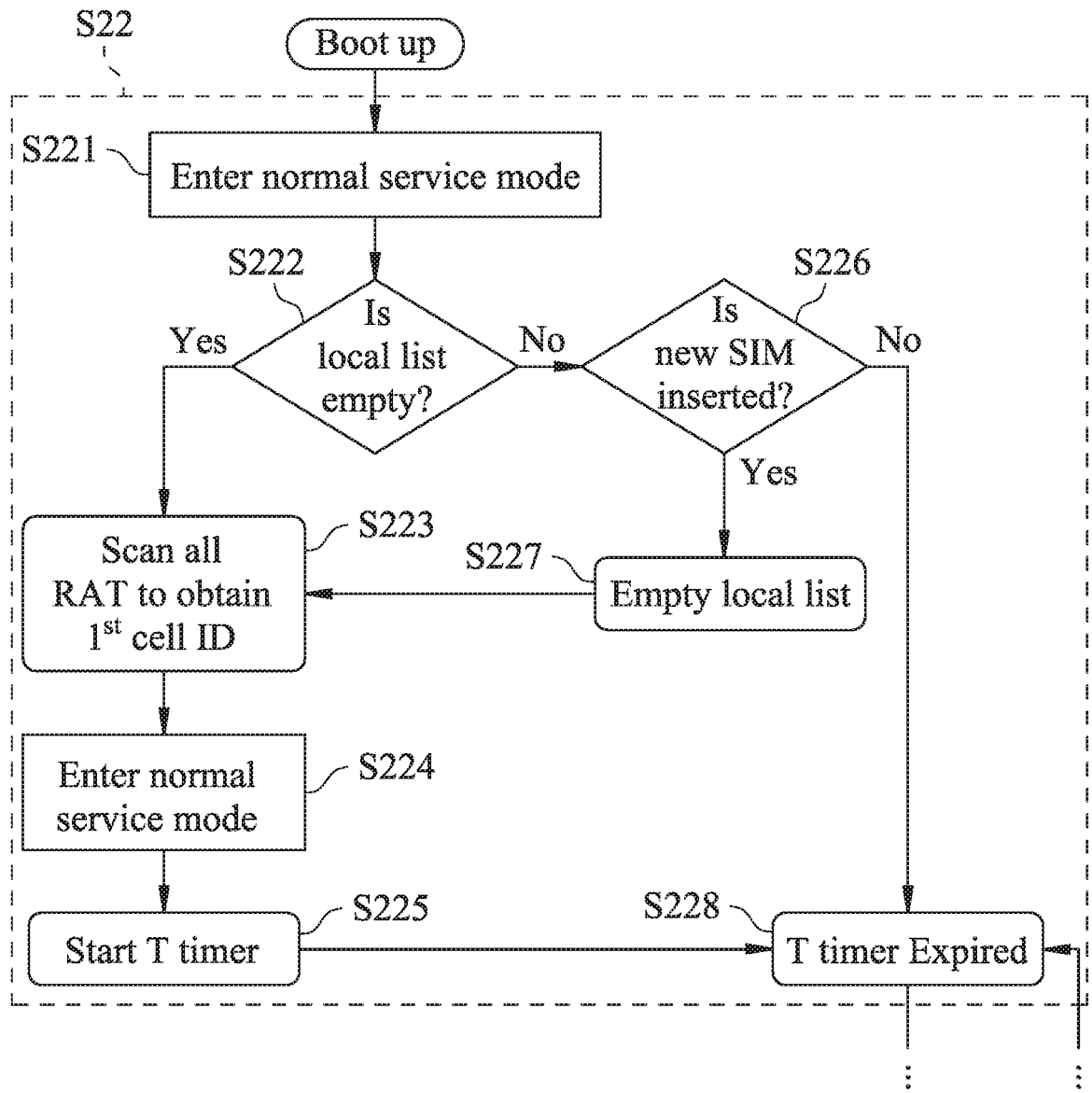
FIG. 5A shows a flow chart of a first part of a method for determining an operation mode of the cellular device according to the second embodiment of the present disclosure.
Figure 5B:
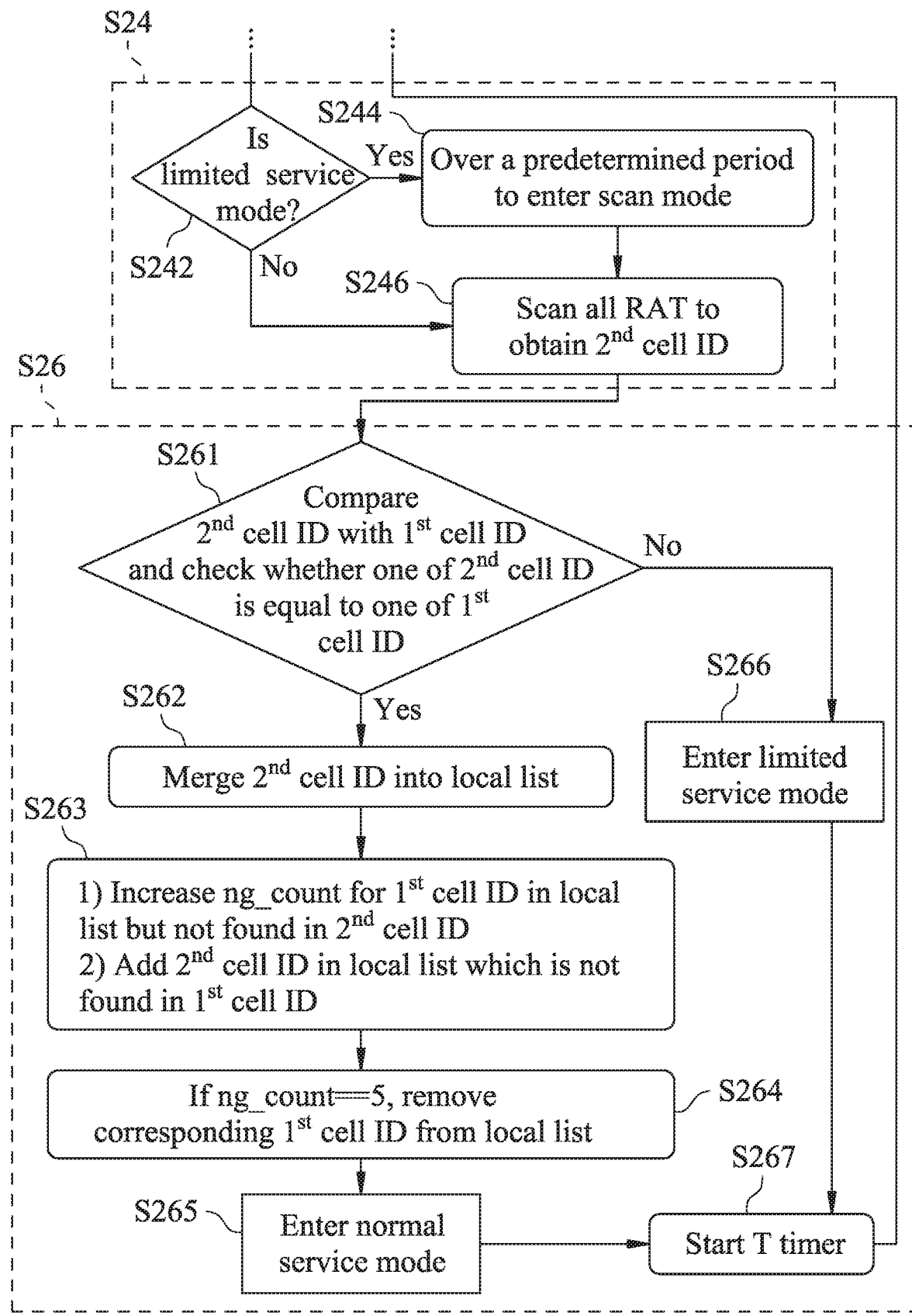
FIG. 5B shows a flow chart of a second part of the method of FIG. 5A.
Figure 6:
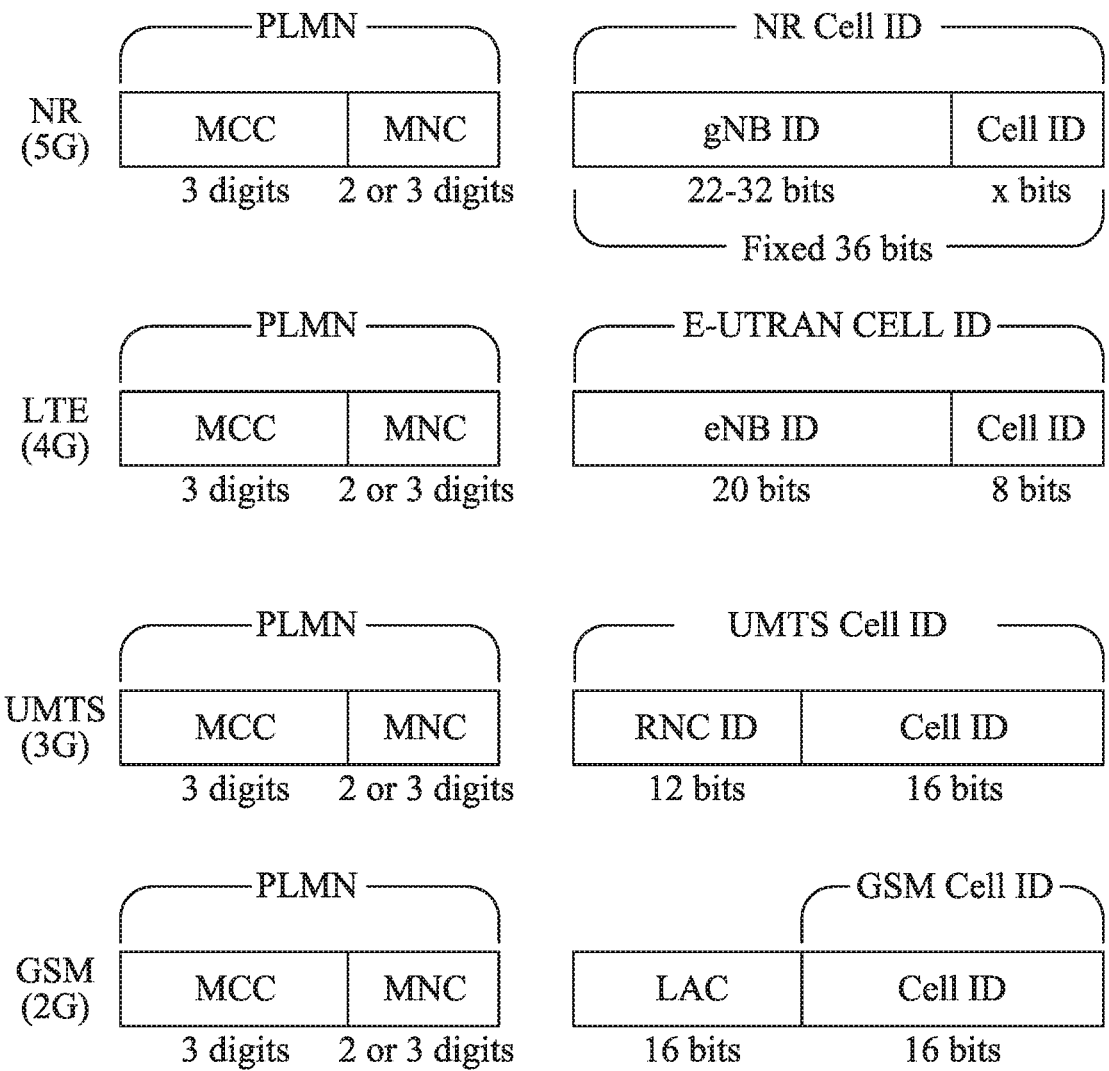
FIG. 6 shows data structures of group cell identity of the method of FIGS. 5A and 5B.
Figure 7:
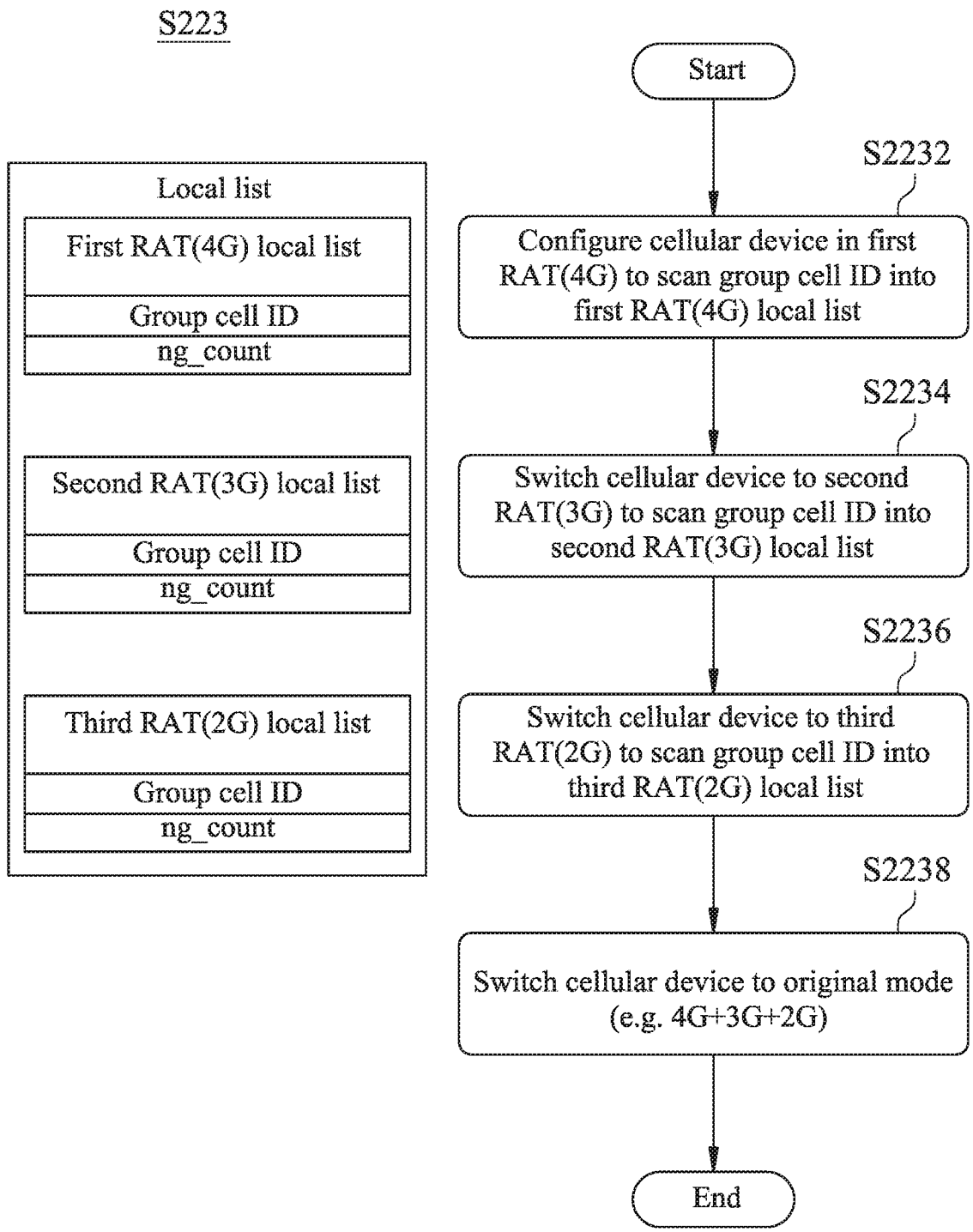
FIG. 7 shows a flow chart of a pre-scan procedure of the method of FIG. 5A.

FIG. 4 shows a schematic view of locations of the cellular device relative to two base stations BS1, BS2 according to a second embodiment of the present disclosure. FIG. 5A shows a flow chart of a first part of a method 100a for determining an operation mode of a cellular device CD according to the second embodiment of the present disclosure. FIG. 5B shows a flow chart of a second part of the method 100a of FIG. 5A. FIG. 6 shows data structures of group cell identity of the method 100a of FIGS. 5A and 5B. FIG. 7 shows a flow chart of a pre-scan procedure of the method 100a of FIG. 5A. In this embodiment, the cellular device CD may apply a loose criterion that when each of the first group cell identities is different from each of the second group cell identities, the cellular device CD enters the limited service mode. At least one of the second group cell identities is equal to one of the first group cell identities, the cellular device CD enters the normal service mode. The method 100a provides a first group cell identity obtaining step S22, a second group cell identity obtaining step S24 and a group cell identity comparing step S26.

The first group cell identity obtaining step S22 includes configuring the cellular device CD to obtain a plurality of first group cell identities corresponding to at least one base station at a first time, and storing the first group cell identities in a local list of the cellular device CD. In detail, a number of the first group cell identities is equal to or greater than two. The first group cell identity obtaining step S22 includes a plurality of steps S221, S222, S223, S224, S225, S226, S227, S228. The step S221 includes configuring the cellular device CD to enter a normal service mode to enable an Internet service. The step S222 includes checking whether the local list stored in a memory of the cellular device CD is empty. The memory may be a flash. In response to determining that the local list is empty, a pre-scan procedure of the step S223 is performed by the cellular device CD and disables the Internet service. In response to determining that the local list is not empty, the step S226 is performed. The step S224 includes configuring the cellular device CD to enter the normal service mode to enable the Internet service. The step S225 includes setting a timer to start at a starting time. The timer has a countdown setting or is set to a specific time. The step S226 includes checking whether a new subscriber identity module (SIM) card is inserted in the cellular device CD. In response to determining that the new SIM card is inserted in the cellular device CD, the step S227 is performed to empty the local list, and then the pre-scan procedure of the step S223 is performed to obtain the first group cell identities. In response to determining that the new SIM card is not inserted in the cellular device, the step S228 is performed. The step S228 includes setting the timer to expire at an expiration time. If the timer is set to the specific time, the specific time is corresponding to the expiration time.

The second group cell identity obtaining step S24 includes configuring the cellular device CD to perform the scan procedure to obtain a plurality of second group cell identities at a second time, and the second time is after the first time. In detail, a number of the second group cell identities is equal to or greater than two. The second group cell identity obtaining step S24 includes a plurality of steps S242, S244, S246. The step S242 includes checking whether the cellular device CD is in a limited service mode. In response to determining that the cellular device CD is in the limited service mode over a predetermined period, the steps S244 and S246 are performed to obtain the second group cell identities and disable the Internet service. In response to determining that the cellular device CD is in the normal service mode over the predetermined period, the step S246 is performed and disables the Internet service. The step S244 includes configuring the cellular device CD to enter a scan mode over a predetermined period, and then the scan procedure is performed to obtain the second group cell identities.

The group cell identity comparing step S26 includes comparing the first group cell identities with the second group cell identities to determine the operation mode of the cellular device CD. In response to determining that the first group cell identities are totally different from the second group cell identities, the cellular device CD enters the limited service mode. In response to determining that one of the first group cell identities is equal to one of the second group cell identities, the cellular device CD enters the normal service mode. In detail, the group cell identity comparing step S26 includes a plurality of steps S261, S262, S263, S264, S265, S266, S267. The step S261 includes comparing the first group cell identities with the second group cell identities and checking whether one of the second group cell identities is equal to one of the first group cell identities. The step S262 includes merging the second group cell identities into the local list when one of the second group cell identities is equal to one of the first group cell identities. The step S263 includes increasing a count for one of the first group cell identities existed in the local list but not found in the second group cell identities, and adding one of the second group cell identities in the local list which is not found in the first group cell identities. In other words, in response to determining that the first group cell identities include at least one different first group cell identity different from any one of the second group cell identities, a count (ng_count) of the at least one different first group cell identity is increased. In response to determining that the second group cell identities include at least one different second group cell identity different from any one of the first group cell identities, the at least one different second group cell identity is added in the local list. The step S264 includes removing the at least one different first group cell identity from the local list if the count (ng_count) of the at least one different first group cell identity is equal to or greater than a predetermined value, e.g., the predetermined value is five. The step S265 includes configuring the cellular device CD to enter the normal service mode to enable the Internet service. The step S266 includes configuring the cellular device CD to enter the limited service mode. The step S267 includes setting the timer to start at another starting time. After the step S267, the process returns back to the step S228, and then the second group cell identity obtaining step S24 and the group cell identity comparing step S26 are repeatedly performed.

In FIG. 6, each of the first group cell identities and the second group cell identities includes an evolved universal terrestrial radio access network (E-UTRAN) cell identity, a universal mobile telecommunication system (UMTS) cell identity or a location area code-global system for mobile communication (LAC-GSM) cell identity. The E-UTRAN cell identity has 28 bits. The UMTS cell identity has 28 bits. The LAC-GSM cell identity includes a location area code (LAC) and a global system for mobile communications (GSM) cell identity, and the LAC-GSM cell identity has 32 bits. In another embodiment, each of the first group cell identities and the second group cell identities further includes a public land mobile network (PLMN) identity having a mobile country code (MCC) and a mobile network code (MNC). In other words, when the cellular device CD operates in a first radio access technology (RAT), e.g., long term evolution (LTE, 4G), each of the first group cell identities and the second group cell identities includes the PLMN identity and the E-UTRAN cell identity. When the cellular device CD operates in a second RAT, e.g., UMTS (3G), each of the first group cell identities and the second group cell identities includes the PLMN identity and the UMTS cell identity. When the cellular device CD operates in a third RAT, e.g., GSM (2G), each of the first group cell identities and the second group cell identities includes the PLMN identity and the LAC-GSM cell identity.

In addition, the PLMN identity combined with the E-UTRAN cell identity is globally unique. The PLMN identity combined with the UMTS cell identity is globally unique. The PLMN identity combined with the LAC-GSM cell identity is globally unique. For example, Table 1 shows one embodiment of the E-UTRAN cell identity relative to two base stations BS1, BS2 in FIG. 4. In the embodiment of the present disclosure, the E-UTRAN cell identity includes an eNB ID (i.e., one of "12345" and "12346") and a Cell ID (i.e., one of "01", "02" and "03"), as shown in FIG. 6 and Table 1. For LTE, the base station is called eNB (evolved Node B). For WCDMA, the base station is called NB (Node B). For GSM, the base station is called BTS (Base Transceiver Station). In one embodiment, each of the first group cell identities and the second group cell identities includes a new radio (NR) cell identity. In other words, when the cellular device CD operates in a fourth RAT, e.g., NR (5G), each of the first group cell identities and the second group cell identities includes the PLMN identity and the NR cell identity. The NR cell identity has 36 bits. The NR cell identity includes a gNB ID (22-32 bits) and a Cell ID (x bits). The PLMN identity combined with the NR cell identity is globally unique, as shown in FIG. 6.

TABLE 1

| Base station | Group cell identity | E-UTRAN cell identity |
| --- | --- | --- |
| BS1 | G_Cell_ID_1 | 0x1234501 |
|  | G_Cell_ID_2 | 0x1234502 |
|  | G_Cell_ID_3 | 0x1234503 |
| BS2 | G_Cell_ID_4 | 0x1234601 |
|  | G_Cell_ID_5 | 0x1234602 |
|  | G_Cell_ID_6 | 0x1234603 |

In FIG. 7, the pre-scan procedure of the step S223 of the method 100a of FIG. 5A includes a plurality of steps S2232, S2234, S2236, S2238. The step S2232 includes configuring the cellular device CD in a first RAT (4G) to scan a group cell identity into a first RAT (4G) local list of the local list. One base station may have a plurality of Cell IDs corresponding to a plurality of group cell identities. The group cell identities may include a serving cell identity and at least one neighbor cell identity or only one serving cell identity. Referring to FIG. 7, when a cellular device CD in the location A is served by G_Cell_ID_1 of the base station BS1 in connection to Internet, G_Cell_ID_1 would be the serving cell identity, and G_Cell_ID_2 and G_Cell_ID_4 would be the neighbor cell identities. The first RAT (4G) local list includes the group cell identity and the count (ng_count). The step S2234 includes switching the cellular device CD to a second RAT (3G) to scan the group cell identity into a second RAT (3G) local list of the local list. The second RAT (3G) local list includes the group cell identity and the count (ng_count). The step S2236 includes switching the cellular device CD to a third RAT (2G) to scan the group cell identity into a third RAT (2G) local list of the local list. The third RAT (2G) local list includes the group cell identity and the count (ng_count). The group cell identities of the first RAT (4G) local list, the second RAT (3G) local list and the third RAT (2G) local list are combined to form the first group cell identities. The counts (ng_count) of the steps S2232, S2234, S2236 are equal to zero. In addition, the scan procedure of the step S246 of the method 100a of FIG. 5B is the same as the pre-scan procedure of the step S223 of the method 100a of FIG. 5A. Then, the group cell identity comparing step S26 includes comparing the group cell identity of the step S2232 (i.e., a first pre-scan group cell identity) with the group cell identity of the step S2462 (i.e., a first scan group cell identity) to generate a first comparison result when the cellular device CD operates in the first RAT (4G). The group cell identity comparing step S26 includes comparing the group cell identity of the step S2234 (i.e., a second pre-scan group cell identity) with the group cell identity of the step S2464 (i.e., a second scan group cell identity) to generate a second comparison result when the cellular device CD operates in the second RAT (3G). The group cell identity comparing step S26 includes comparing the group cell identity of the step S2236 (i.e., a third pre-scan group cell identity) with the group cell identity of the step S2466 (i.e., a third scan group cell identity) to generate a third comparison result when the cellular device CD operates in the third RAT (2G). Finally, after the cellular device CD operating all of the first RAT, the second RAT and the third RAT, the operation mode may be determined according to the first comparison result, the second comparison result and the third comparison result. In other words, the cellular device CD supports the first RAT, the second RAT and the third RAT. The first RAT, the second RAT and the third RAT are different from each other. The first group cell identities include the first pre-scan group cell identity, the second pre-scan group cell identity and the third pre-scan group cell identity corresponding to the first RAT, the second RAT and the third RAT, respectively. The second group cell identities include the first scan group cell identity, the second scan group cell identity and the third scan group cell identity corresponding to the first RAT, the second RAT and the third RAT, respectively. During the pre-scan procedure of the step S223 or the scan procedure of the step S246 of the method 100a, the cellular device CD can be sequentially switched to single RAT to perform the cell scan so as to achieve scanning completeness. In one embodiment, the pre-scan procedure of the step S223 of the method 100a of FIG. 5A may include other steps for other RATs, such as the fourth RAT (5G) or newer RATs.

For example, in FIG. 4, which shows the schematic view of locations of the cellular device CD relative to two base stations BS1, BS2. When the cellular device CD is moved from a location A at the first time to a location B at the second time, the first group cell identity obtaining step S22, the second group cell identity obtaining step S24 and the group cell identity comparing step S26 are sequentially performed. In the first group cell identity obtaining step S22, the cellular device CD obtains two first group cell identities G_Cell_ID_1, G_Cell_ID_2 corresponding to the base station BS1 and one first group cell identity G_Cell_ID_4 corresponding to the base station BS2 at the first time, and storing the first group cell identities G_Cell_ID_1, G_Cell_ID_2, G_Cell_ID_4 in the local list of the cellular device CD. Then, in the second group cell identity obtaining step S24, the cellular device CD performs the scan procedure to obtain the second group cell identities G_Cell_ID_1, G_Cell_ID_4 at the second time in the location B. The second time is after the first time. Finally, in the group cell identity comparing step S26, the first group cell identities G_Cell_ID_1, G_Cell_ID_2, G_Cell_ID_4 are compared with the second group cell identities G_Cell_ID_1, G_Cell_ID_4 to determine the operation mode of the cellular device CD. One of the first group cell identities G_Cell_ID_1, G_Cell_ID_2, G_Cell_ID_4 is equal to one of the second group cell identities G_Cell_ID_1, G_Cell_ID_4, and the first group cell identity G_Cell_ID_2 is different from any one of the second group cell identities G_Cell_ID_1, G_Cell_ID_4, so that the first group cell identity G_Cell_ID_2 is regarded as a different first group cell identity, and the count (ng_count) of the first group cell identity G_Cell_ID_2 is increased, i.e., the count (ng_count) of the first group cell identity G_Cell_ID_2 is equal to 1. The operation mode of the cellular device CD is determined to be the normal service mode in the group cell identity comparing step S26.

In FIG. 4, when the cellular device CD is moved from the location B at the second time to a location C at a third time, the second group cell identity obtaining step S24 and the group cell identity comparing step S26 are sequentially performed. The first group cell identities G_Cell_ID_1, G_Cell_ID_2, G_Cell_ID_4 are stored in the local list at the second time. In the second group cell identity obtaining step S24, the cellular device CD performs the scan procedure to obtain the second group cell identities G_Cell_ID_4, G_Cell_ID_6 at the third time. The third time is after the second time. Then, in the group cell identity comparing step S26, the first group cell identities G_Cell_ID_1, G_Cell_ID_2, G_Cell_ID_4 are compared with the second group cell identities G_Cell_ID_4, G_Cell_ID_6 to determine the operation mode of the cellular device CD. One of the first group cell identities G_Cell_ID_1, G_Cell_ID_2, G_Cell_ID_4 is equal to one of the second group cell identities G_Cell_ID_4, G_Cell_ID_6, and the first group cell identities G_Cell_ID_1, G_Cell_ID_2 are different from any one of the second group cell identities G_Cell_ID_4, G_Cell_ID_6, so that the first group cell identities G_Cell_ID_1, G_Cell_ID_2 are regarded as different first group cell identities, and the counts (ng_count) of the first group cell identities G_Cell_ID_1, G_Cell_ID_2 are increased, i.e., the counts (ng_count) of the first group cell identities G_Cell_ID_1, G_Cell_ID_2 are equal to 1 and 2, respectively. In addition, the second group cell identity G_Cell_ID_6 is different from any one of the first group cell identities G_Cell_ID_1, G_Cell_ID_2, G_Cell_ID_4, so that the second group cell identity G_Cell_ID_6 is regarded as a different second group cell identity and is added in the local list. Therefore, a plurality of new first group cell identities are formed by G_Cell_ID_1, G_Cell_ID_2, G_Cell_ID_4 and G_Cell_ID_6, and are stored in the local list. The operation mode of the cellular device CD is determined to be the normal service mode in the group cell identity comparing step S26.

In FIG. 4, when the cellular device CD is moved from the location C at the third time to a location D at a fourth time, the second group cell identity obtaining step S24 and the group cell identity comparing step S26 are sequentially performed. The first group cell identities G_Cell_ID_1, G_Cell_ID_2, G_Cell_ID_4, G_Cell_ID_6 are stored in the local list at the third time. In the second group cell identity obtaining step S24, the cellular device CD performs the scan procedure to obtain the second group cell identity G_Cell_ID_Y at the fourth time. The fourth time is after the third time. Then, in the group cell identity comparing step S26, the first group cell identities G_Cell_ID_1, G_Cell_ID_2, G_Cell_ID_4, G_Cell_ID_6 are compared with the second group cell identity G_Cell_ID_Y to determine the operation mode of the cellular device CD. The first group cell identities G_Cell_ID_1, G_Cell_ID_2, G_Cell_ID_4, G_Cell_ID_6 are totally different from the second group cell identity G_Cell_ID_Y, so that the cellular device CD enters the limited service mode, i.e., the operation mode of the cellular device CD is determined to be the limited service mode in the group cell identity comparing step S26. Please note that if the cellular device CD maintains in the location C instead of moving to the location D, the counts (ng_count) of the first group cell identities G_Cell_ID_1, G_Cell_ID_2 would exceed a predetermined value, e.g., 5, then the first group cell identities G_Cell_ID_1, G_Cell_ID_2 would be removed.

Figure 8:
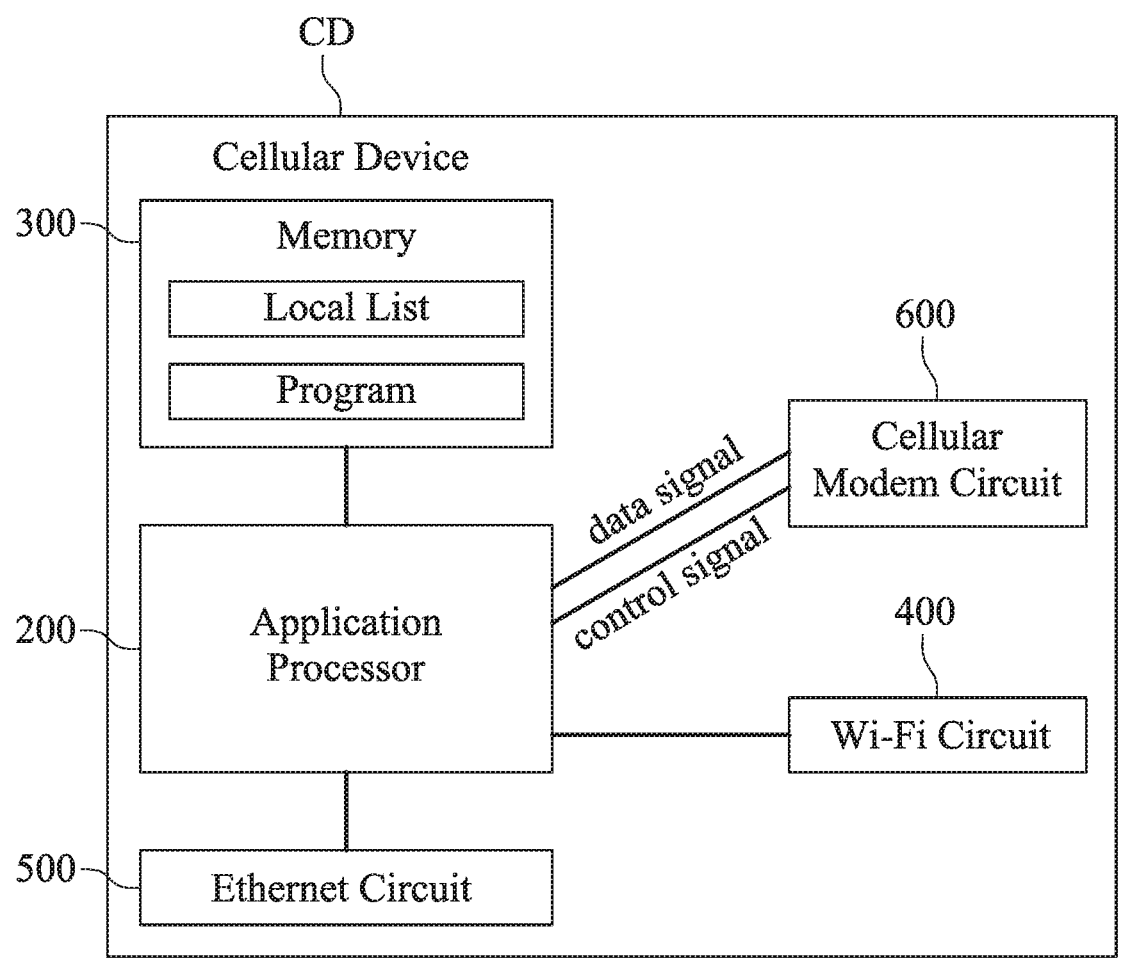
FIG. 8 shows a of a block diagram of a cellular device according to a third embodiment of the present disclosure.

FIG. 8 shows a of a block diagram of a cellular device CD according to a third embodiment of the present disclosure. The cellular device CD includes an application processor 200, a memory 300, a Wi-Fi circuit 400, an Ethernet circuit 500 and a cellular modem circuit 600. The application processor 200 is signally connected to the memory 300, the Wi-Fi circuit 400, the Ethernet circuit 500 and the cellular modem circuit 600. The memory 300 stores the local list and programs. The programs include source codes of the first group cell identity obtaining step S12, the second group cell identity obtaining step S14 and the group cell identity comparing step S16 of FIG. 2, the first group cell identity obtaining step S22 of FIG. 5A, the second group cell identity obtaining step S24 and the group cell identity comparing step S26 of FIG. 5B. The cellular device CD may provide an Internet service via the application processor 200 and the cellular modem circuit 600. The Wi-Fi circuit 400 and the Ethernet circuit 500 are provided interfaces in connection to Internet for users. The cellular modem circuit 600 may support 5G/4G/3G/2G modem functionalities in compliance with 3GPP standard. The memory 300 may be a multi-chip package (MCP) 4 Gb NAND flash for storing the local list and the programs. The Wi-Fi circuit 400 includes a Wi-Fi chipset to support 2.4G/5G Wi-Fi networks. The Ethernet circuit 500 has a plurality of Ethernet ports for connecting with user devices. The cellular modem circuit 600 can be communicated with the application processor 200 via a data signal path and a control signal path. When the cellular device CD performs the steps of S223 and S246, the data signal path is disabled so as to disable the Internet service of the cellular device CD. The signal of the Internet service is transmitted over the data signal path. The signals of the first group cell identity obtaining steps S12, S22, the second group cell identity obtaining steps S14, S24 and the group cell identity comparing steps S16, S26 are transmitted over the control signal path. In one embodiment, the cellular modem circuit 600 and the application processor 200 are separate chipsets. In another embodiment, the cellular modem circuit 600 and the application processor 200 may be a single chipset. Therefore, the cellular device CD of the present disclosure can determine its operation mode instead of the ISP, and the location of the cellular device CD may be monitored via cell identity comparison for locking location, so that the cellular device CD of the present disclosure has a control right to determine the operation mode.

According to the aforementioned embodiments and examples, the advantages of the present disclosure are described as follows.

1. The cellular device and the method for determining the operation mode thereof of the present disclosure can utilize cell identity comparison to determine the operation mode of cellular device instead of the ISP, and the location of the cellular device may be monitored via cell identity comparison for locking location, so that the cellular device of the present disclosure has a control right to determine the operation mode.

2. During the pre-scan procedure or the scan procedure of the method of the present disclosure, the cellular device CD can be sequentially switched to single RAT to perform the cell scan so as to achieve scanning completeness.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for determining an operation mode of a cellular device, comprising:
   providing a first group cell identity obtaining step, wherein the first group cell identity obtaining step comprises configuring the cellular device to obtain a plurality of first group cell identities corresponding to a base station and storing the first group cell identities in a local list of the cellular device;
   providing a second group cell identity obtaining step, wherein the second group cell identity obtaining step comprises configuring the cellular device to perform a scan procedure to obtain a plurality of second group cell identities; and
   providing a group cell identity comparing step, wherein the cell identity comparing step comprises comparing the first group cell identities with the second group cell identities to determine the operation mode of the cellular device in a normal service mode or a limited service mode;
   wherein the first group cell identities are obtained at a first time, the second group cell identities are obtained at a second time, and the second time is after the first time;
   in response to determining that the first group cell identities are totally different from the second group cell identities, the cellular device enters the limited service mode; and
   in response to determining that at least one of the first group cell identities is equal to one of the second group cell identities, the cellular device enters the normal service mode.

2. The method of claim 1, wherein the second group cell identity obtaining step further comprises:
   checking whether the cellular device is in the limited service mode;
   in response to determining that the cellular device is in the limited service mode over a predetermined period, the scan procedure is performed to obtain the second group cell identities.

3. The method of claim 1, wherein when the cellular device is in the normal service mode,
   in response to determining that the first group cell identities comprise at least one different first group cell identity different from any one of the second group cell identities, a count of the at least one different first group cell identity is increased; and in response to determining that the second group cell identities comprise at least one different second group cell identity different from any one of the first group cell identities, the at least one different second group cell identity is added in the local list.

4. The method of claim 1, wherein the cellular device supports a first radio access technology (RAT) and a second RAT, the first RAT is different from the second RAT, the first group cell identities comprise a first pre-scan group cell identity and a second pre-scan group cell identity, the first pre-scan group cell identity is corresponding to the first RAT, and the second pre-scan group cell identity is corresponding to the second RAT.

5. The method of claim 4, wherein the second group cell identities comprise a first scan group cell identity and a second scan group cell identity, the first scan group cell identity is corresponding to the first RAT, and the second scan group cell identity is corresponding to the second RAT, when the cellular device operates in the first RAT, the group cell identity comparing step comprises comparing the first pre-scan group cell identity with the first scan group cell identity to determine the operation mode of cellular device.

6. The method of claim 1, wherein the first group cell identity obtaining step further comprises:

checking whether the local list stored in the cellular device is empty, and in response to determining that the local list is empty, a pre-scan procedure is performed by the cellular device to obtain the first group cell identities corresponding to the base station.

7. The method of claim 6, wherein the first group cell identity obtaining step further comprises:

in response to determining that the local list is not empty, checking whether a new subscriber identity module (SIM) card is inserted in the cellular device, and in response to determining that the new SIM card is inserted in the cellular device, the local list is emptied, and then the pre-scan procedure is performed to obtain the first group cell identities corresponding to the base station.

8. The method of claim 1, wherein each of the first group cell identities and the second group cell identities comprises an evolved universal terrestrial radio access network (E-UTRAN) cell identity, a universal mobile telecommunication system (UMTS) cell identity or a location area code-global system for mobile communication (LAC-GSM) cell identity, the E-UTRAN cell identity has 28 bits, the UMTS cell identity has 28 bits, the LAC-GSM cell identity comprises a location area code (LAC) and a global system for mobile communications (GSM) cell identity, and the LAC-GSM cell identity has 32 bits.

9. The method of claim 8, wherein each of the first group cell identities and the second group cell identities further comprises a public land mobile network (PLMN) identity having a mobile country code (MCC) and a mobile network code (MNC).

10. A cellular device, comprising:

a memory; and an application processor signally connected to the memory and configured to implement a method for determining an operation mode of the cellular device comprising:

providing a first group cell identity obtaining step, wherein the first group cell identity obtaining step comprises configuring the cellular device to obtain a plurality of first group cell identities corresponding to a base station and storing the first group cell identities in a local list of the cellular device;

providing a second group cell identity obtaining step, wherein the second group cell identity obtaining step comprises configuring the cellular device to perform a scan procedure to obtain a plurality of second group cell identities; and providing a group cell identity comparing step, wherein the cell identity comparing step comprises comparing the first group cell identities with the second group cell identities to determine the operation mode in a normal service mode or a limited service mode;

wherein the first group cell identities are obtained at a first time, the second group cell identities are obtained at a second time, and the second time is after the first time;

in response to determining that the first group cell identities are totally different from the second group cell identities, the cellular device enters the limited service mode; and in response to determining that one of the first group cell identities is equal to one of the second group cell identities, the cellular device enters the normal service mode.

11. The cellular device of claim 10, wherein each of the first group cell identities and the second group cell identities comprises an evolved universal terrestrial radio access network (E-UTRAN) cell identity, a universal mobile telecommunication system (UMTS) cell identity or a location area code-global system for mobile communication (LAC-GSM) cell identity, the E-UTRAN cell identity has 28 bits, the UMTS cell identity has 28 bits, the LAC-GSM cell identity comprises a location area code (LAC) and a global system for mobile communications (GSM) cell identity, and the LAC-GSM cell identity has 32 bits.

12. The cellular device of claim 11, wherein each of the first group cell identities and the second group cell identities further comprises a public land mobile network (PLMN) identity having a mobile country code (MCC) and a mobile network code (MNC).

* * * * *